F. MILOS.
COLLAR BUTTON.
APPLICATION FILED OCT. 2, 1916.
1,229,773. Patented June 12, 1917.
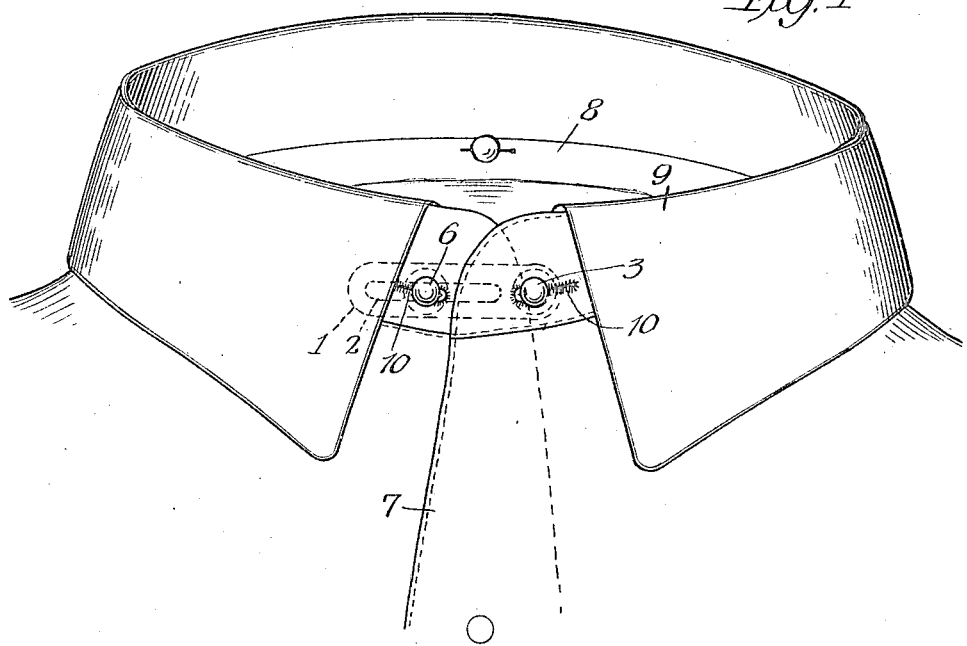
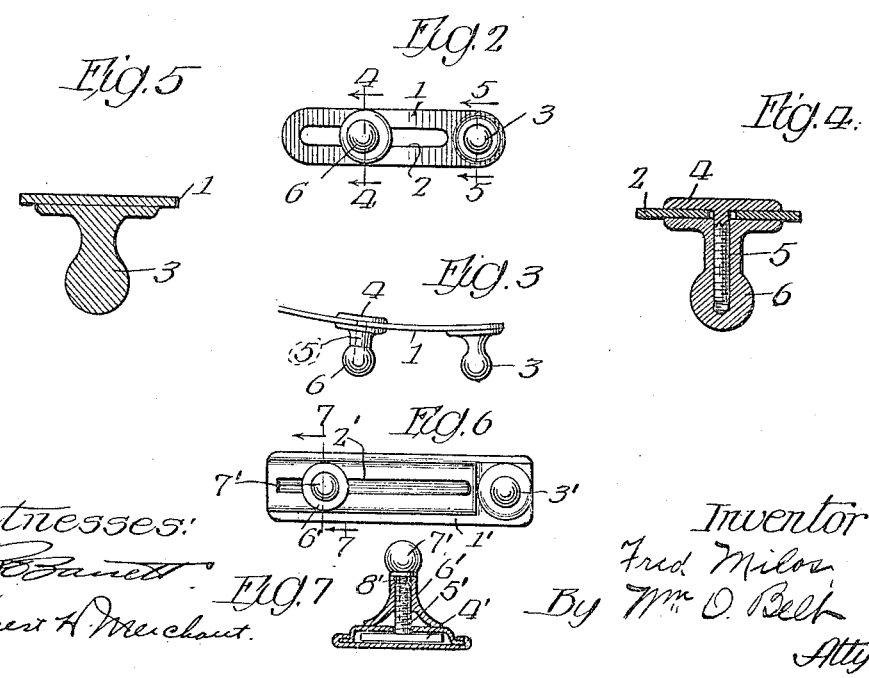

UNITED STATES PATENT OFFICE.

FRED MILOS, OF CHICAGO, ILLINOIS.

COLLAR-BUTTON.

1,229,773.

Specification of Letters Patent.

Patented June 12, 1917.

Application filed October 2, 1916. Serial No. 123,241.

*To all whom it may concern:*

Be it known that I, FRED MILOS, a subject of the Emperor of Austria, residing at Chicago, in the county of Cook and State of Illinois, have invented certain new and useful Improvements in Collar-Buttons, of which the following is a specification.

This invention relates to a fastening device for shirt-bands and collars and has for its object the provision of an adjustable device of simple construction whereby the normal size of the shirt-band and collar may be increased and the collar may be securely fastened in position without detracting from its appearance.

Other objects and advantages of my invention will be apparent as it is better understood by reference to the following specification when read in connection with the accompanying drawing, illustrating the preferred embodiment thereof, in which—

Figure 1 is a view in perspective illustrating the mode of applying my invention to a shirt-band and collar;

Fig. 2 is a plan view of the device according to my invention;

Fig. 3 is a side elevation of the device;

Fig. 4 is a section on the line 4—4 of Fig. 2;

Fig. 5 is a section on the line 5—5 of Fig. 2;

Fig. 6 is a plan view of a slightly different form of my invention, and

Fig. 7 is a section on the line 7—7 of Fig. 6.

Referring to Figs. 1 to 5 of the drawing, 1 indicates an elongated base preferably slightly curved as indicated in Fig. 3 and provided with a slot 2 extending throughout practically its entire length. Adjacent one end of the base 1 a stud 3 is secured in any suitable manner thereto. A member 4 is adapted to be positioned rearwardly of the base 1 and is provided with a screw 5 projecting through the slot 2. A stud 6 is threadedly mounted on the screw 5. The stud 6 may thus be readily secured to the base 1 in any desired relation to the stud 3.

In Figs. 6 and 7 I have illustrated a slightly different form of my invention in which the base 1' is formed of two strips of metal clipped together at their edges, the upper strip of metal being provided with a slot 2' and a stud 3' secured at one end thereof. A member 4' is positioned between the strips and provided with a screw 5' projecting through the slot 2'. A member 6' is threadedly mounted on the screw 5' and forms the body of a stud. A head 7' is provided with a screw 8' which engages an internal thread in the screw 5' whereby the member 6' is locked in position.

The manner of using my invention is clearly illustrated in Fig. 1 in which a shirt 7 is provided with a band 8, the ends of which are provided with the usual complementary holes. A collar 9 is disposed about the band 8 with the button-holes 10 in its ends disposed above the button-holes in the band 8. The stud 3 engages the superposed button-holes in one end of the band 8 and the collar 9 while the other stud 6 engages the button-holes in the opposite ends of the band 8 and the collar 9, thus securely holding the band 8 and the collar 9 with the complementary button-holes in spaced relation. As the stud 6 is adjustable on the base 1 the space between the button-holes in the band 8 and collar 9 may be varied at will and the band and collar may be enlarged to fit comfortably regardless of their original size.

From the foregoing description it will be apparent that I have perfected an extremely simple device adapted to accomplish a novel and highly desirable result which not only adds greatly to the comfort of the wearer but makes it possible to wear shirts and collars which have been inadvertently purchased in sizes which are too small to be comfortably worn or which have shrunken or otherwise become too small. My invention further provides a simple means whereby persons engaged in athletic games may temporarily enlarge the neck opening of a shirt for greater comfort without detracting from the appearance thereof.

It will be apparent also that various changes may be made in the form, construction and arrangement of the parts without departing from the spirit and scope of the invention or sacrificing any of its material advantages, the form hereinbefore described being merely a preferred embodiment thereof.

I claim:

1. In a device of the character described, the combination of a base provided with a slot, a stud fixedly secured to said base adjacent one end of said slot, and a movable stud supported in said slot and adapted to be adjustably secured at any desired position between the ends of said slot, said movable stud comprising a member disposed behind said slot having a threaded projection extending through said slot and a button-hole-engaging portion threadedly engaging said projection whereby said movable stud is securely clamped in selected position.

2. In a device of the character described, the combination of a base comprising two strips secured together at their edges, the upper strip being provided with a slot, a stud fixedly secured to said base adjacent one end of said slot, and a stud comprising a member disposed between said strips and having a projection extending through said slot, and a button-hole-engaging portion mounted on said extension to selectively clamp said upper strip in predetermined adjusted position, said studs being each adapted for engagement with complementary button-holes of a shirt band.

3. In a device of the character described, the combination of a base comprising two metal strips secured together at their edges, the upper strip being provided with a slot, a stud fixedly secured to said base adjacent one end of said slot, and a stud comprising a member disposed between said strips and having a projection extending through said slot, a body portion mounted on said extension and a head removably secured to said extension, said studs being each adapted for engagement with complementary button-holes of a shirt band.

FRED MILOS.

Witnesses:
ERNEST H. MERCHANT,
W. T. WESTERBERG.

Copies of this patent may be obtained for five cents each, by addressing the "Commissioner of Patents, Washington, D. C."